United States Patent
Shim (10) Patent No.: US 7,277,545 B1
(45) Date of Patent: Oct. 2, 2007

(54) SCRAMBLER AND SCRAMBLING METHOD

(75) Inventor: Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 805 days.

(21) Appl. No.: 09/620,462

(22) Filed: Jul. 20, 2000

(30) Foreign Application Priority Data

Jul. 20, 1999 (KR) ................. 1999-29280

(51) Int. Cl.
H04L 9/00 (2006.01)
(52) U.S. Cl. .................................. 380/239
(58) Field of Classification Search ............ 369/59.24, 369/59.1, 44.38, 44.39, 59.26, 59.27, 60.01, 369/275.3; 380/268, 46, 221, 239, 28, 236, 380/54; 708/235, 250
See application file for complete search history.

(56) References Cited

U.S. PATENT DOCUMENTS

| | | | | |
|---|---|---|---|---|
| 5,661,707 A * | 8/1997 | Matsui | ..................... | 369/59.24 |
| 6,125,100 A * | 9/2000 | Sensyu | ..................... | 369/275.3 |
| 6,182,263 B1 * | 1/2001 | Kojima et al. | ............. | 714/769 |
| 6,898,171 B1 * | 5/2005 | Sugaya et al. | ........... | 369/275.3 |
| 2002/0012528 A1 * | 1/2002 | Ando et al. | ................... | 386/95 |

FOREIGN PATENT DOCUMENTS

| JP | 2-295215 | 12/1990 |
|---|---|---|
| JP | 3-68022 | 3/1991 |
| JP | 3-120125 | 12/1991 |
| JP | 4-46413 | 2/1992 |
| JP | 5-327695 | 12/1993 |
| JP | 6-51957 | 2/1994 |
| JP | 6-274885 | 9/1994 |
| JP | 6-296279 | 10/1994 |
| JP | 6-309800 | 11/1994 |
| JP | 7-134647 | 5/1995 |
| JP | 7-161139 | 6/1995 |
| JP | 8-55343 | 2/1996 |
| JP | 11-505358 | 5/1999 |

OTHER PUBLICATIONS

ECMA-267, "120mm DVD read only disk", Dec. 1997.*

* cited by examiner

Primary Examiner—Gilberto Barrón, Jr.
Assistant Examiner—Thomas Ho
(74) Attorney, Agent, or Firm—Stein, McEwen & Bui, LLP

(57) ABSTRACT

A scrambler and scrambling method. The scrambler has a random data generator which generates random data having a random data generation cycle based on a result obtained by multiplying at least a size of a first data frame by a result obtained by dividing a data amount of two tracks in an outermost circumference of an optical disc by a size of a second data frame. The scrambler is advantageous in generating a stable servo signal and suppressing a DC component in modulation in a high density disc system using the optical disc.

29 Claims, 9 Drawing Sheets

| ID(7:4) | VALUE | ID(7:4) | VALUE |
|---|---|---|---|
| 0h | 0001h | 8h | 0010h |
| 1h | 5500h | 9h | 5000h |
| 2h | 0002h | Ah | 0020h |
| 3h | 2A00h | Bh | 2001h |
| 4h | 0004h | Ch | 0040h |
| 5h | 5400h | Dh | 4002h |
| 6h | 0008h | Eh | 0080h |
| 7h | 2800h | Fh | 0005h |

| ID(7:4) | VALUE | ID(7:4) | VLAUE |
|---------|-------|---------|-------|
| 00h | 0001h | 08h | 0010h |
| 01h | 7F80h | 09h | F808h |
| 02h | 0002h | 0Ah | 0020h |
| 03h | FF01h | 0Bh | F011h |
| 04h | 0004H | 0Ch | 0040h |
| 05h | FE02h | 0Dh | E023h |
| 06h | 0008h | 0Eh | 0080h |
| 07h | FC04h | 0Fh | C046h |

| NO | Branch VALUE ($D_{015} \sim D_{00}$) | NO | Branch VALUE ($D_{015} \sim D_{00}$) |
|---|---|---|---|
| 1 | 8016h | 27 | 8940h |
| 2 | 801Ch | 28 | 8A04h |
| 3 | 8029h | 29 | 9028h |
| 4 | 80D0h | 30 | 9082h |
| 5 | 810Ah | 31 | 9120h |
| 6 | 810Ch | 32 | 9420h |
| 7 | 8112h | 33 | 9840h |
| 8 | 8142h | 34 | 9C00h |
| 9 | 8148h | 35 | A084h |
| 10 | 8150h | 36 | A101h |
| 11 | 8214H | 37 | A108h |
| 12 | 8241H | 38 | A140h |
| 13 | 8244H | 39 | A440h |
| 14 | 8248H | 40 | A801h |
| 15 | 8260H | 41 | A840h |
| 16 | 8320H | 42 | B010h |
| 17 | 8406H | 43 | B400h |
| 18 | 8430H | 44 | C009h |
| 19 | 8540H | 45 | C00Ah |
| 20 | 8580H | 46 | C042h |
| 21 | 8610H | 47 | C108h |
| 22 | 8805H | 48 | C120h |
| 23 | 8821H | 49 | C208h |
| 24 | 8841H | 50 | C801h |
| 25 | 8842H | 51 | CA00h |
| 26 | 8920H | 52 | D008h |

FIG. 8

| ID(7:4) | VALUE | ID(7:4) | VALUE |
|---------|-------|---------|-------|
| 00h | 0001h | 08h | 7F80h |
| 01h | 3DADh | 09h | D36Eh |
| 02h | D4E7h | 0Ah | BB39h |
| 03h | FDCAh | 0Bh | 5DFFh |
| 04h | EBCCh | 0Ch | A809H |
| 05h | 292Eh | 0Dh | 6647h |
| 06h | 50F0h | 0Eh | 8044h |
| 07h | BFCAh | 0Fh | 0304h |

| ID(7:4) | VALUE | ID(7:4) | VALUE |
|---------|-------|---------|-------|
| 00h | 829h | 08h | 906h |
| 01h | 834h | 09h | 960h |
| 02h | 84Ch | 0Ah | 990h |
| 03h | 868h | 0Bh | A03h |
| 04h | 883h | 0Ch | A18H |
| 05h | 891h | 0Dh | B04h |
| 06h | 8B0h | 0Eh | C48h |
| 07h | 8C2h | 0Fh | CA0h |

SCRAMBLER AND SCRAMBLING METHOD

CROSS-REFERENCE TO RELATED APPLICATIONS

This application claims the benefit of Korean Application No. 99-29280, filed Jul. 20, 1999, in the Korean Patent Office, the disclosure of which is incorporated herein by reference.

BACKGROUND OF THE INVENTION

1. Field of the Invention

The present invention relates to data scrambling, and more particularly, to a scrambler and a scrambling method appropriate for a high density disc system.

2. Description of the Related Art

In general, the goal of data scrambling is to protect data from users who do not have key. For telecommunications, data scrambling is a widely used randomizing method for security communications purposes.

An optical disc system using an optical disc, such as a compact disc-read only memory (CD-ROM) or a digital versatile disc (DVD), adopts a random data generator which randomizes certain data input into a scrambler.

The first reason for scrambling input data in an optical disc system is to smoothly perform tracking control using differential phase detection (DPD). If identical data are input and the same modulated codes of the identical data are recorded in neighboring tracks on a disc, DPD signals are not detected during reproduction and tracking control in a servo unit becomes difficult. For example, in an unscrambled CD-audio disc, DPD control becomes difficult in a section between songs (a section in which data are all "00h").

The second reason for scrambling is to help reduce a burden to control suppression of a direct current (DC) component in a modulator. When identical data are continuously input, digital sum value (DSV) control may be impossible for some values. In order to prevent such worst cases, randomizing is needed. Here, the DSV is a parameter for predicting the DC direction, and it is preferable that a modulated code word has a characteristic of converging into a DC value.

The third reason for scrambling is to protect certain data. In the case of a CD-ROM, in order to protect a synchronization pattern (00h, FFh, FFh, . . . , FFh, 00h) in data, scrambling is performed on all data except synchronization data.

Figure 1:
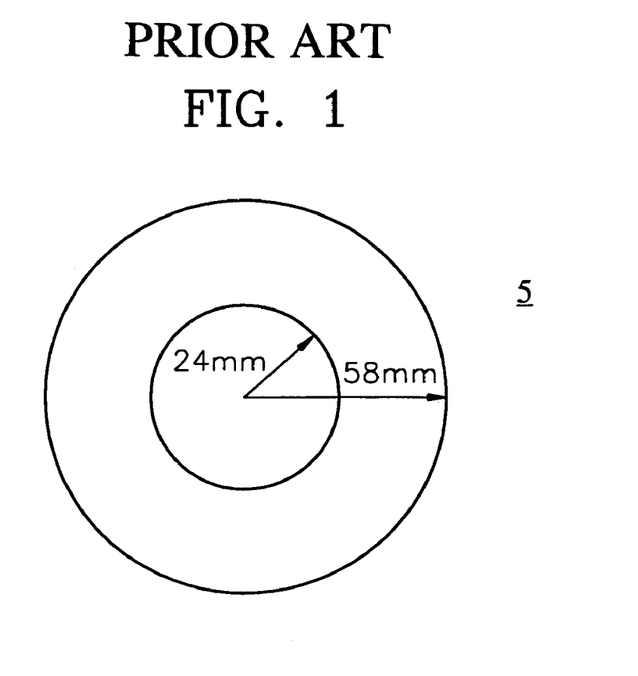
FIG. 1 is a general diagram showing an inner circumference and an outer circumference of a disc.

Referring to FIG. 1, the periodicity of a scrambler for a general DVD system will now be explained. Since the length of a channel bit is 0.133 μm, the physical length of a sector is 5.146 mm (=0.133 μm×1488×26), the radius of the innermost circumference of a disc 5 is 24 mm (as shown in FIG. 1), the track length of the innermost circumference is 150.8 mm (=2πr) and the track capacity of the innermost circumference is 29.3 sectors (=150.8 mm/5.146 mm). In addition, since the radius of the outermost circumference is 58 mm as shown in FIG. 1, the track length of the outermost circumference is 364.42 mm (=2πr) and the track capacity of the outermost circumference is 70.82 sectors (364.42 mm/5.146 mm).

For DPD control, the cycle of random data generation of a scrambler must be equal to or greater than 141.64 sectors (=70.82 sector×2) in the outermost circumference. Identical data repeating within 29.3 sectors in the innermost circumference do not cause any problem in DPD control.

Figure 2:
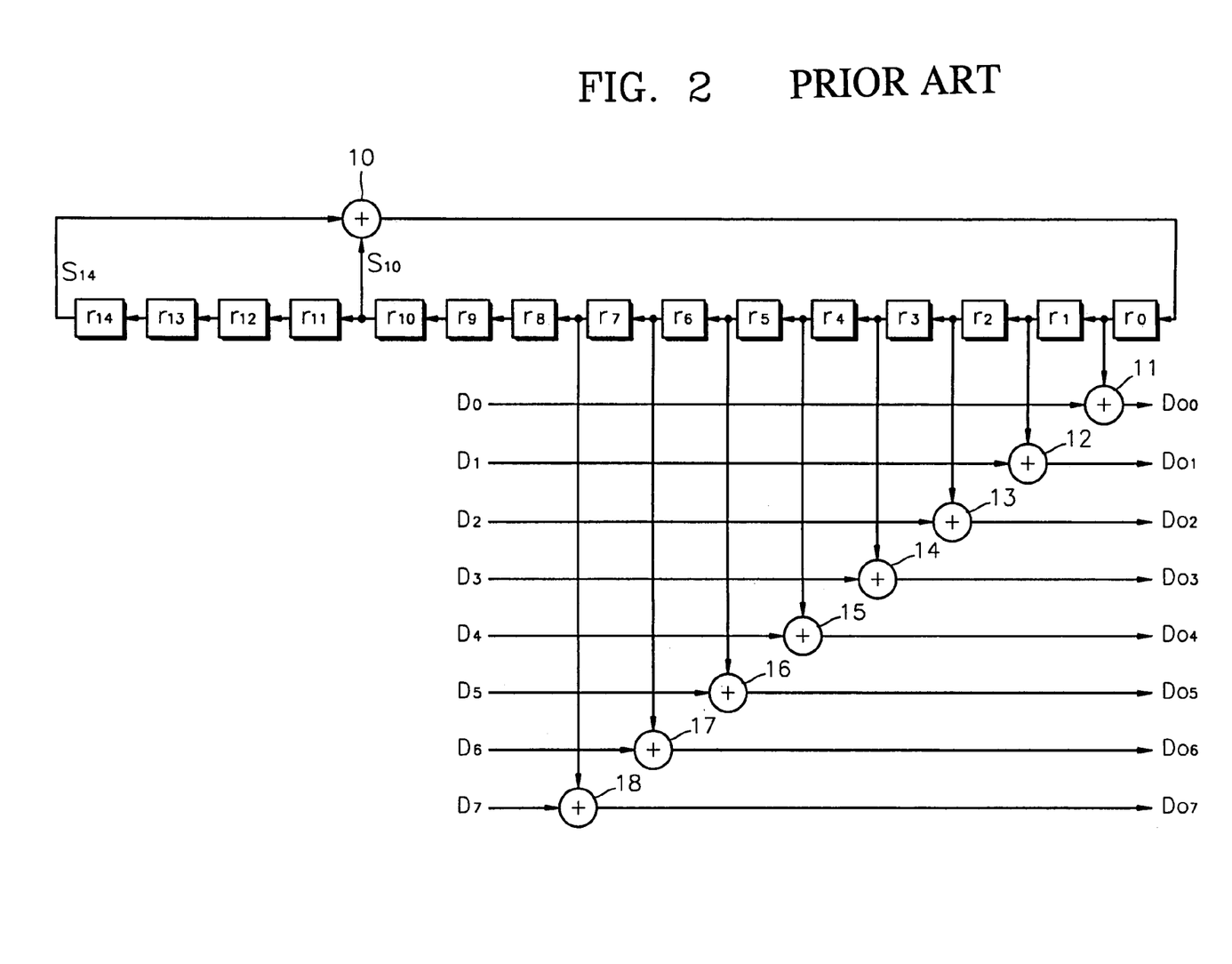
FIG. 2 illustrates a circuit diagram of a scrambler in a general digital versatile disc (DVD) system.

FIG. 2 illustrates a circuit diagram of a scrambler in a DVD system, in which an exclusive-or (XOR) gate 10 and 15 registers $r_0$ through $r_{14}$ for supplying random data are referred to as a random data generator. The random data generator and XOR gates 11 through 18 are referred to as a scrambler.

The 15 registers $r_0$ through $r_{14}$ in FIG. 2 perform left shifting in synchronization with a clock signal for scrambling, which is not shown in FIG. 2. During the scrambling, an XOR value obtained from XOR gate 10 by XORing the output of the most significant register $r_{14}$ and the output of the $11^{th}$ lowest register $r_{10}$, becomes an input value to the least significant register $r_0$.

The cycle of random data generation of the random data generator in FIG. 2 is 32K (kilobytes), and matches the 32K-size of 1 error correction code (ECC) block of a DVD. That is, random data without a periodicity are generated in one ECC block, and after left-shifting the 15 registers $r_0$ through $r_{14}$ 8 times, the result $D_{01}$ through $D_{07}$ of XORing each of the 8 outputs of the lower registers $r_0$ through $r_7$ and 1-byte input data $D_0$ through $D_7$ in XOR gates 11 through 18 is obtained as the result of scrambling. Here, the data clock speed of XOR gates 11 through 18 is an eighth of the scramble clock speed of the registers $r_0$ through $r_{14}$, which is not shown in FIG. 2.

In the meantime, since scrambling is performed after left-shifting the 15 registers $r_0$ through $r_{14}$, 8 times, registers $r_0$ through $r_{14}$ are initialized by preset values, referring to the upper significant 4 bits (ID 7:4) in the last one byte in a 4-byte identification code (ID) allocated to each sector. At this time, selection of initial values needs to be handled carefully. That is, even if identical data are input, random data must be generated using the identical initial value in a sector, and random data in this sector are repeated by the identical initial value for one ECC block (16 sectors).

Figure 3:
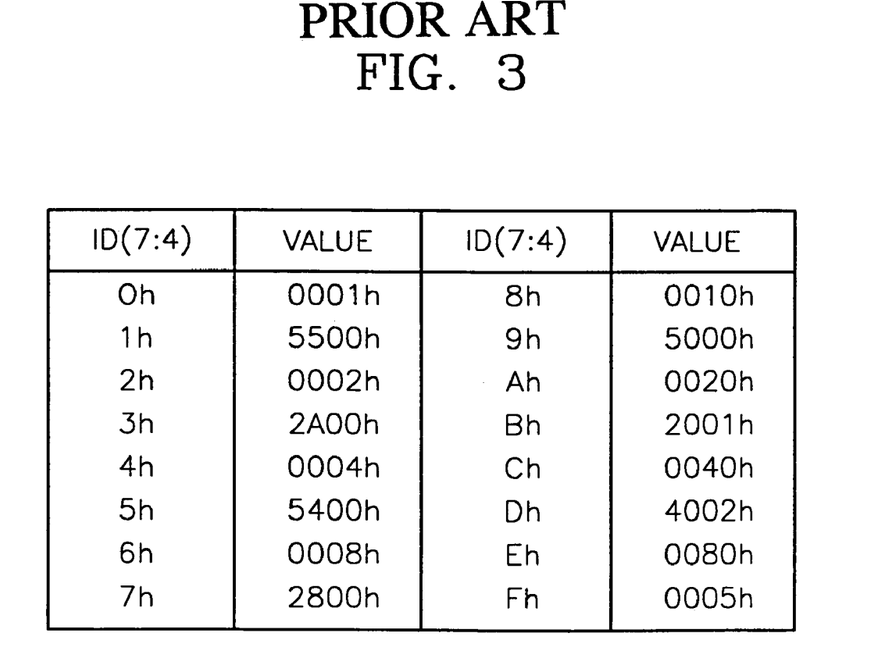
FIG. 3 is a table showing initial values used in registers shown in FIG. 2.

As shown in FIG. 3, the first initial value of registers $r_0$ through $r_{14}$ "0001h" and the result of left-shifting "0001h" 7 times are 0002h, 0004h, 0008h, 0010h, 0020h, 0040h, 0080h; the result of left-shifting 7 times "5500h", the value of registers $r_0$ through $r_{14}$ after 16K (=2K×8) capacity required for the return of the values 0001h, 0002h, 0004h, 0008h, 0010h, 0020h, 0040h, 0080h, are 2A00h, 5400h, 2800h, 5000h, 2001h, 4002h, 0005h; and 0001h, 0002h, 0004h, 0008h, 0010h, 0020h, 0040h, 0080h, 5500h, 2A00h, 5400h, 2800h, 5000h, 2001h, 4002h, 0005h, which are used for initial values of $r_0$ through $r_{14}$.

The scrambler of FIG. 2 uses all of the 32K of random data generated by the random data generator, and sector data in one ECC block are repeated. However, the scrambler of FIG. 2 does not have the DPD control problem mentioned in FIG. 1. In addition, since random data are generated for one sector during modulation, there is no DSV control. Using the initial values of registers shown in FIG. 3, identical data are not generated contiguously ECC blocks during 256 sectors (=1 ECC block (16 sectors)×16 times initialization). Therefore, since identical code data do not occur in contiguous tracks in the outermost circumference of a disc, there is no problem in DPD control.

However, the previous random data generator and the scrambler using the random data generator cannot respond properly when generation of random data having a cycle greater than 32K and corresponding scrambling are required.

SUMMARY OF THE INVENTION

To solve the above problems, it is an object of the present invention to provide a scrambler appropriate for high density optical disc systems, by controlling the cycle of random data generation.

It is another object to provide a scrambler which is advantageous in generating stable servo signals and suppressing a direct current (DC) component in modulation.

It is still another object to provide a method of scrambling which is appropriate for high density optical disc systems, by controlling the cycle of random data generation.

It is yet still another object to provide a method of scrambling which is advantageous in generating stable servo signals and suppressing a direct current (DC) component.

Additional objects and advantages of the invention will be set forth in part in the description which follows and, in part, will be obvious from the description, or may be learned by practice of the invention.

To accomplish the above and other objects of the present invention, there is provided a data scrambler for a high density optical recording/reproducing apparatus, the data scrambler having a random data generator which generates random data having a random data generation cycle based on a result obtained by multiplying at least a size of a first data frame by a result obtained by dividing a data amount of two tracks in an outermost circumference by a size of a second data frame There is also provided a data scrambling method using a random data generator for a high density optical recording/reproducing apparatus, the data scrambling method comprising generating random data having a random data generation cycle based on a result by multiplying at least the size of a first data frame by a result, which is obtained by dividing a data amount of two tracks in an outermost circumference of a disc by a size of a second data frame.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art. Like reference numerals refer to like elements throughout.

First, the periodicity of the scrambler in a high density DVD system will be explained.

When it is assumed that compared to a general DVD, an HD-DVD has the same innermost circumference and outermost circumference, but has a line density which is twice as high, the track length of the innermost circumference is 150.8 mm (=2π×24 mm), the track capacity of the innermost circumference is about 120 KB (=60×2 KB), the track length of the outermost circumference is 364.42 mm (=2π×58 mm), and the track capacity of the outermost circumference is about 284 KB (=142×2 KB).

When it is assumed that the line density of an HD-DVD is twice as high as that of a DVD, the cycle of random data generation of a scrambler in the outermost circumference must be equal to or greater than 564(=284K×2) in order to control DPD, and even when identical data are repeated within 120K, no DPD control problem occurs in the innermost circumference.

However, in an HD-DVD, the structure of a scrambler changes depending on whether or not the size of a sector will be 2 KB, or 4 KB, or whether or not the size of an ECC block will be 32 sectors, or 16 sectors, which will now be explained in detail.

First, for the structure of a scrambler for an HD-DVD system having 2 KB for a sector and 32 sectors for an ECC block, the scrambler for a general DVD system shown in FIG. 2 can be used.

That is, since 120K, the track capacity of the innermost circumference, is greater than one ECC block (64 KB) and smaller than two ECC blocks (128 KB), the initial value of each sector in an ECC block can be set to an identical value. In order to prevent repeating of the same data of two tracks in the outermost circumference, a periodicity equal to or more than 564 K is needed. With only 16 initial values, the cycle of random data generation becomes 1024 K (=1 ECC block (64 KB)×16), which is greater than 564 KB and causes no problem. Therefore, the same structure as that of the scrambler for a general DVD system shown in FIG. 2 can be used for an HD-DVD system.

Next, for the structure of a scrambler having 4 KB for a sector and 16 sectors for an ECC block, the scrambler for a general DVD system cannot be used, and the structure of a scrambler must be changed.

Since 120 K, the track capacity of the innermost circumference, is greater than one ECC block (64 KB) and smaller than two ECC blocks (128 KB), the initial value of each sector in an ECC block can be set to an identical value.

Also, in the outermost circumference, in order to obtain a periodicity equal to or more than 564 K, the cycle of random data generation becomes 1024 K (=1 ECC block (64 KB)× 16) with only 16 initial values, which causes no problem. However, since the cycle of random data generation of the random data generator of the scrambler must be equal to or greater than 64 KB (=1 sector (4 KB)×16), the structure of the scrambler in a general DVD as shown in FIG. 2 cannot be used.

Therefore, the present invention proposes three types of scramblers, having a cycle of random data generation equal to or greater than 64 K.

Figure 4:
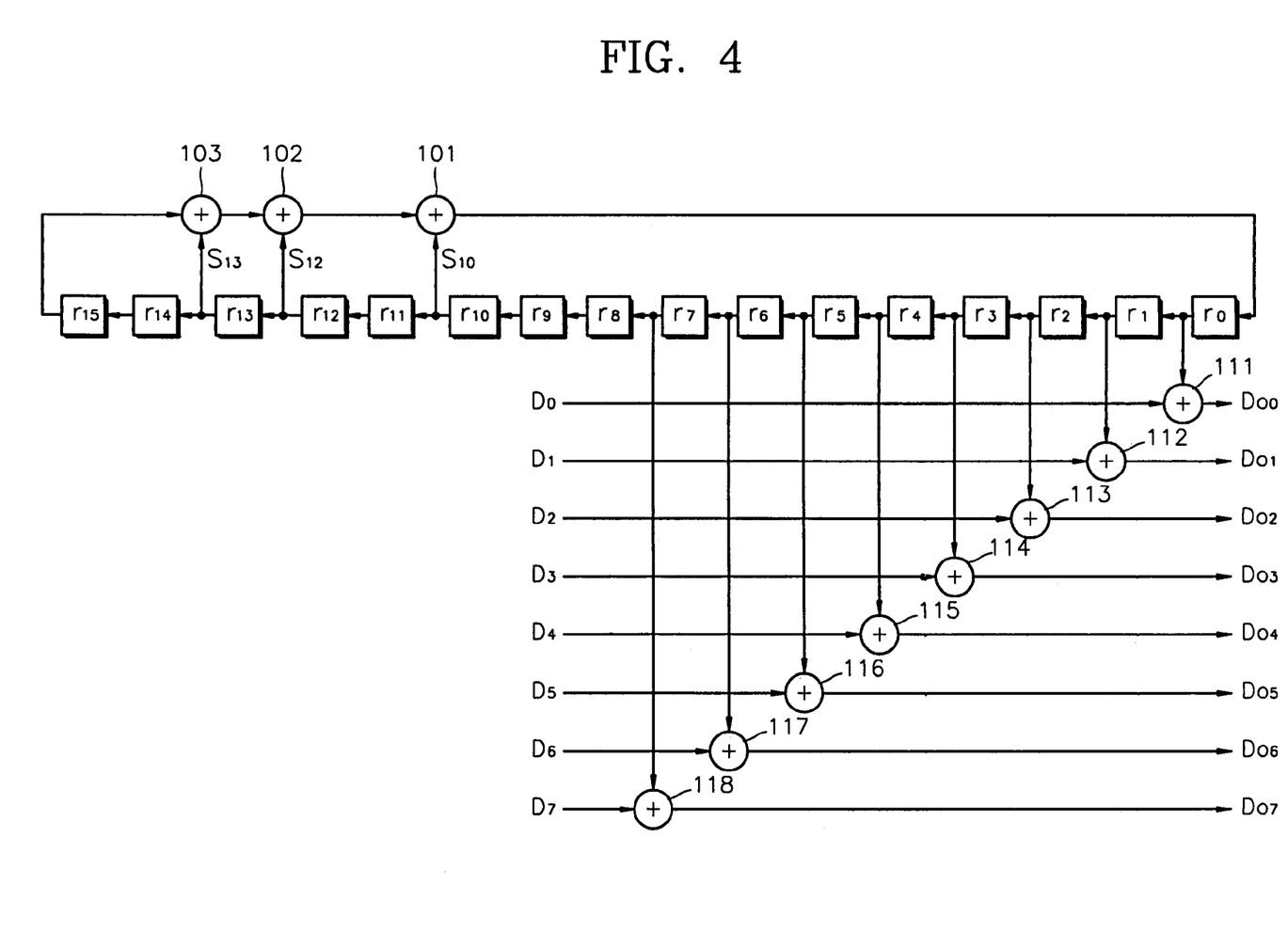
FIG. 4 illustrates a circuit diagram of an embodiment of a scrambler for a high density disc system according to the present invention.

The first structure of a scrambler according to the present invention is shown in FIG. 4, and the structure of the scrambler for an HD-DVD system has some similarities to that of a scrambler for a general DVD system shown in FIG. 2.

That is, 16-bit random data is generated in 16 registers $r_0$ through $r_{15}$, and the result $D_{01}$ through $D_{07}$ of scrambling through XOR gates 111 through 118 1-byte of input data $D_0$ through $D_7$ and outputs of the lower 8 registers $r_0$ through $r_7$ is provided. The XOR gate 103 XORs the output of the most significant register $r_{15}$ and the output of the register $r_{13}$, the XOR gate 102 XORs the output of the XOR gate 103 and the output of the register $r_{12}$, and the XOR gate 101 XORs the output of the XOR gate 102 and the output of the register $r_{10}$ and feeds back its output to the least significant register $r_0$.

Figure 5:
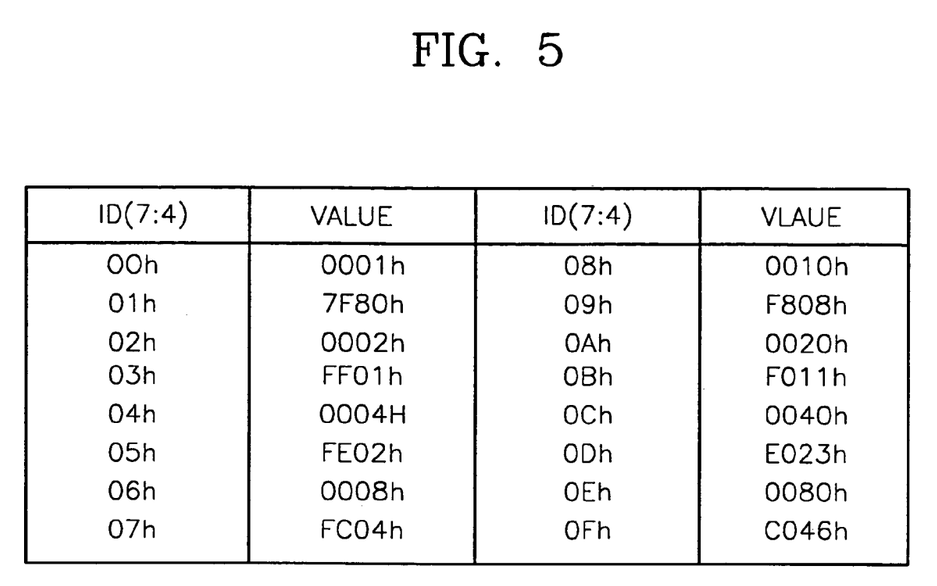
FIG. 5 is a table showing initial values of registers used in the 8-bit shift-scrambler shown in FIG. 4.

FIG. 5 is a table showing initial values of registers used in the 8-bit shift-scrambler for an HD-DVD system shown in FIG. 4. Scrambling is performed in units of 1 byte between the bits of the lower 8 registers $r_0$ through $r_7$ and 1 byte of input data $D_0$ through $D_7$, after 8-bit left-shifting the output of the registers $r_0$ through $r_{15}$. Therefore, for the initial values of the registers, 0001h and the values obtained by left-shifting 0001h (0002h, 0004h, 0008h, 0010h, 0020h, 0040h, 0080h), and 7E80h, which is the result of registers $r_0$ through $r_{15}$ after 32 K (4 K×8 times) that is required for returning these values, and the values obtained by left-shifting 7E80h (FF01h, FE02h, FC04h, F808h, F011h, E023h, C046h) are used.

Here, diverse examples of scramblers adopting a random data generator having a 64 K random data generation cycle, as shown in FIG. 4, are disclosed in the Korean Patent Application No. 99-27886, filed by the present applicant on 10 Jul. 1999, under the title of "Random Data Generator and a Scrambler Using the Random Data Generator".

Figure 6:
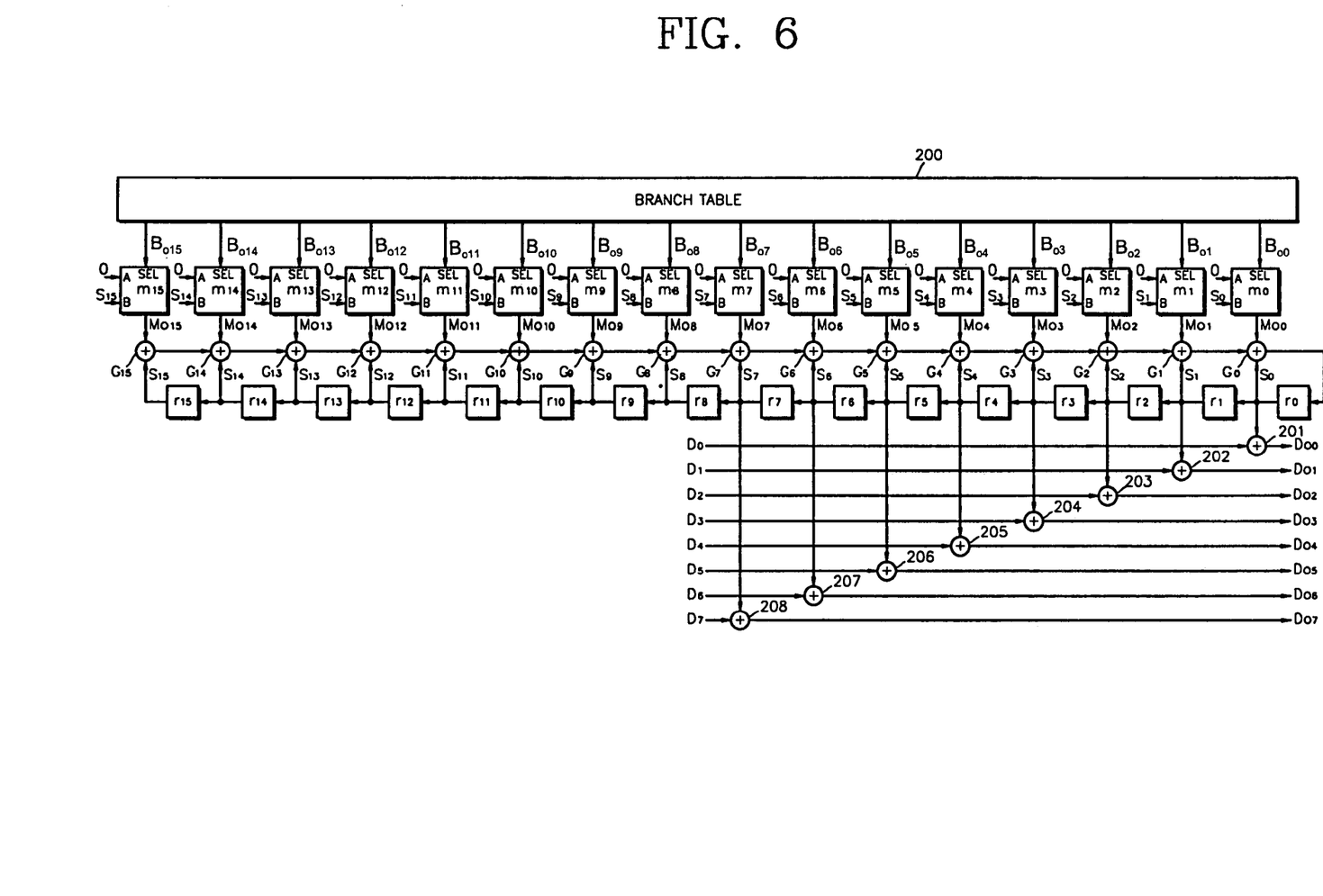
FIG. 6 illustrates a generalized circuit diagram of a scrambler for high density disc system to explain the present invention.
Figure 7:
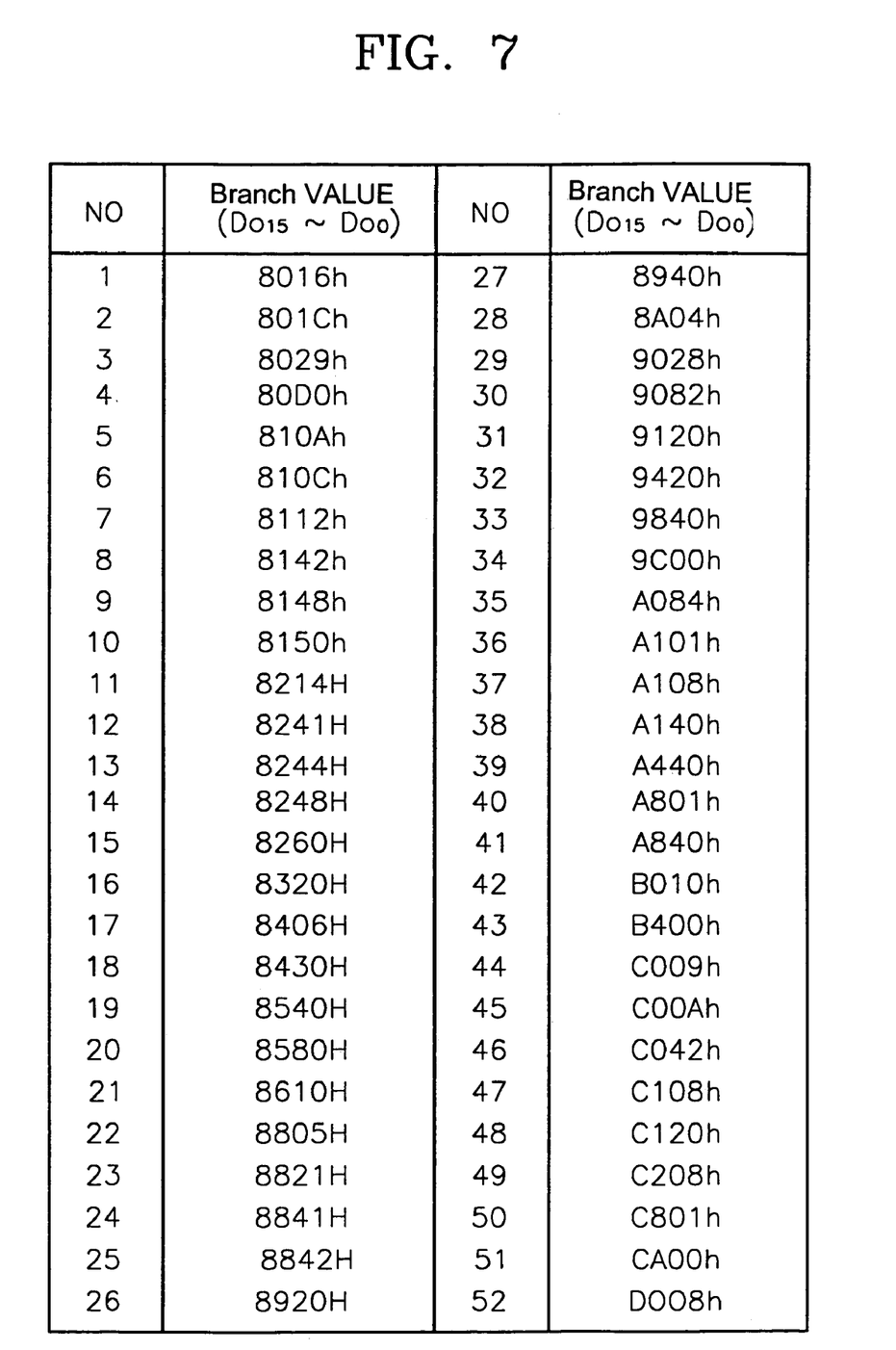
FIG. 7 is a table showing branch values when a random data cycle is 64K and the number of effective branches is 4 in the random data generator shown in FIG. 6.

Referring to FIGS. 6 and 7, a generalized structure of a scrambler shown in FIG. 4 and mentioned in the above application will now be described in order to help explain the present invention.

For example, a branch table 200, shown in FIG. 7, of a scrambler shown in FIG. 6 stores the branch values $B_{o0}$ through $B_{o15}$ for all possible cases when the number of effective branches of the XOR gates $G_0$ through $G_{15}$ of a random data generator is 4. The scrambler in FIG. 4 is implemented in a simple structure in a case where the value of a branch is "B400h".

In FIG. 6, when any one value stored in the branch table 200 is selected, the multiplexors $m_0$ through $m_{15}$ receive the 16 output bits $B_{o0}$ through $B_{o15}$, respectively, according to the selected branch value, as a selection signal. When values of the outputs $B_{o0}$ through $B_{o15}$ of the branch table 200 are "1", corresponding multiplexors of $m_0$ through $m_{15}$ Supply "0", which is input to the first input end (A), to one end of corresponding-XOR gates $G_0$ through $G_{15}$, as an output signal $M_{o0}$ through $M_{o15}$. Corresponding XOR gates $G_0$ through $G_{15}$ output values of $S_0$ through $S_{15}$ of each corresponding register $r_0$ through $r_{15}$, which are input to the other end of each XOR gate $G_0$ through $G_{15}$, without change, and the accumulated output value of XOR gate $G_0$ is finally fed back and input to the least significant register $r_0$.

In addition, when values of the outputs $B_{o0}$ through $B_{o15}$ of the branch table 200 are "0", corresponding multiplexors of $m_0$ through $m_{15}$ supply the outputs $S_0$ through $S_{15}$ of each register $r_0$ through $r_{15}$, which is input to the second input end (B), as its own output signal $Mo_0$ through $Mo_{15}$. Then, corresponding XOR gates of $G_0$ through $G_{15}$ XOR $S_0$ through $S_{15}$, which is the output of each multiplexor $m_0$ through $m_{15}$, and $S_0$ through $S_{15}$, which is the output of each register $r_0$ through $r_{15}$. At this time, since the outputs of corresponding XOR gates $G_0$ through $G_{15}$ finally become "0", no feedback value is input to the least significant register $r_0$.

By doing so, 64 K random data from each register $r_0$ through $r_{15}$ are generated during one ECC block, and the result $D_{01}$ through $D_{07}$ of scrambling by XORing 8 bits of input data $D_0$ through $D_7$ and the outputs of the lower 8 registers $r_0$ through $r_7$, respectively, in XOR gates 201 through 208, respectively, is provided.

Here, if the number of registers is 16, the cycle of random data becomes $2^{16}$ (=approximately 64 K), and if the number of registers is n, the cycle of random data can be expanded to $2^n$.

Figure 8:
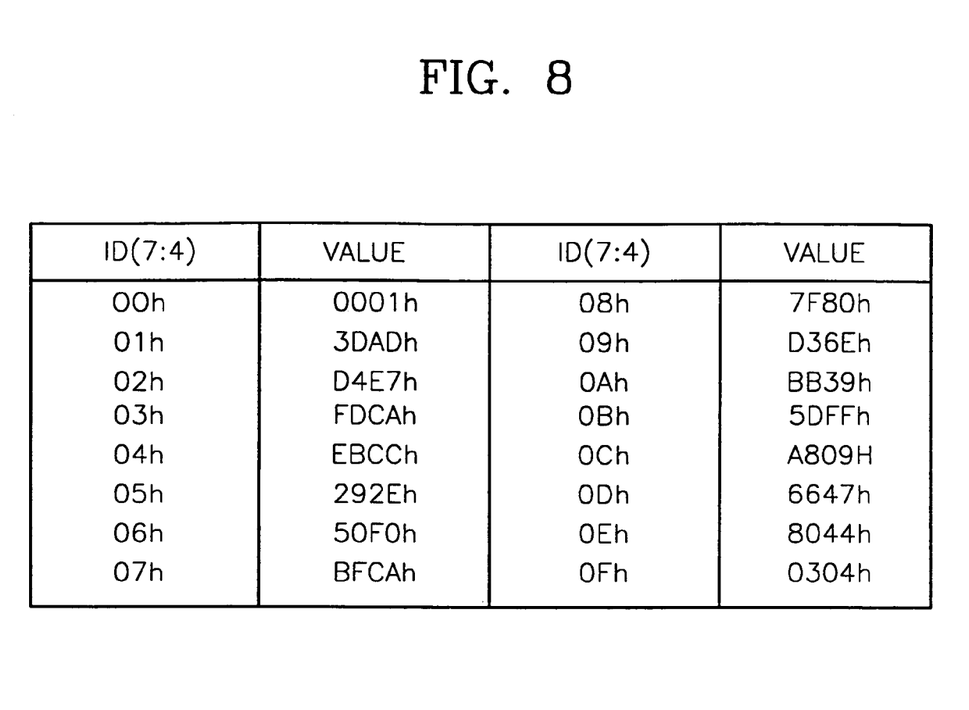
FIG. 8 is a table showing initial values of registers used in a 1-bit shift-scrambler for a high density disc system according to the present invention.

The second structure of a scrambler according to the present invention has the same structure as the scrambler shown in FIG. 4 or FIG. 6. As shown in FIG. 8, however, since its scrambling is performed in units of the lower 8 bits of registers $r_0$ through $r_7$ and 1 byte input data after left-shifting every one bit, the initial values of registers $r_0$ through $r_{15}$, which are determined by the upper 4 bits (ID(7:4)) of the last byte in a 4-byte identification code (ID), which is allocated to each sector, are different from the initial values shown in FIG. 5. The initial values in FIG. 8 are the initial values used in the scrambler of FIG. 4.

That is, the first preset value 0001h and the values (3DADh, D4E7h, FDCAh, EBCCh, 292Eh, 50Fh, 50F0h, BFCAh, 7F80h, D36Eh, BB39h, 5DFFh, A809h, 6647h, 8044h, 0304h) of registers $r_0$ through $r_{15}$, which are obtained after each 4,096 times left-shifting are used as the initial values, which is different from the initial values of FIG. 5.

The second structure of a scrambler according to the present invention has merit in that a serial structure as shown in FIG. 4 or FIG. 6 need not be changed into a parallel structure in response to a need for high speed.

Figure 9:
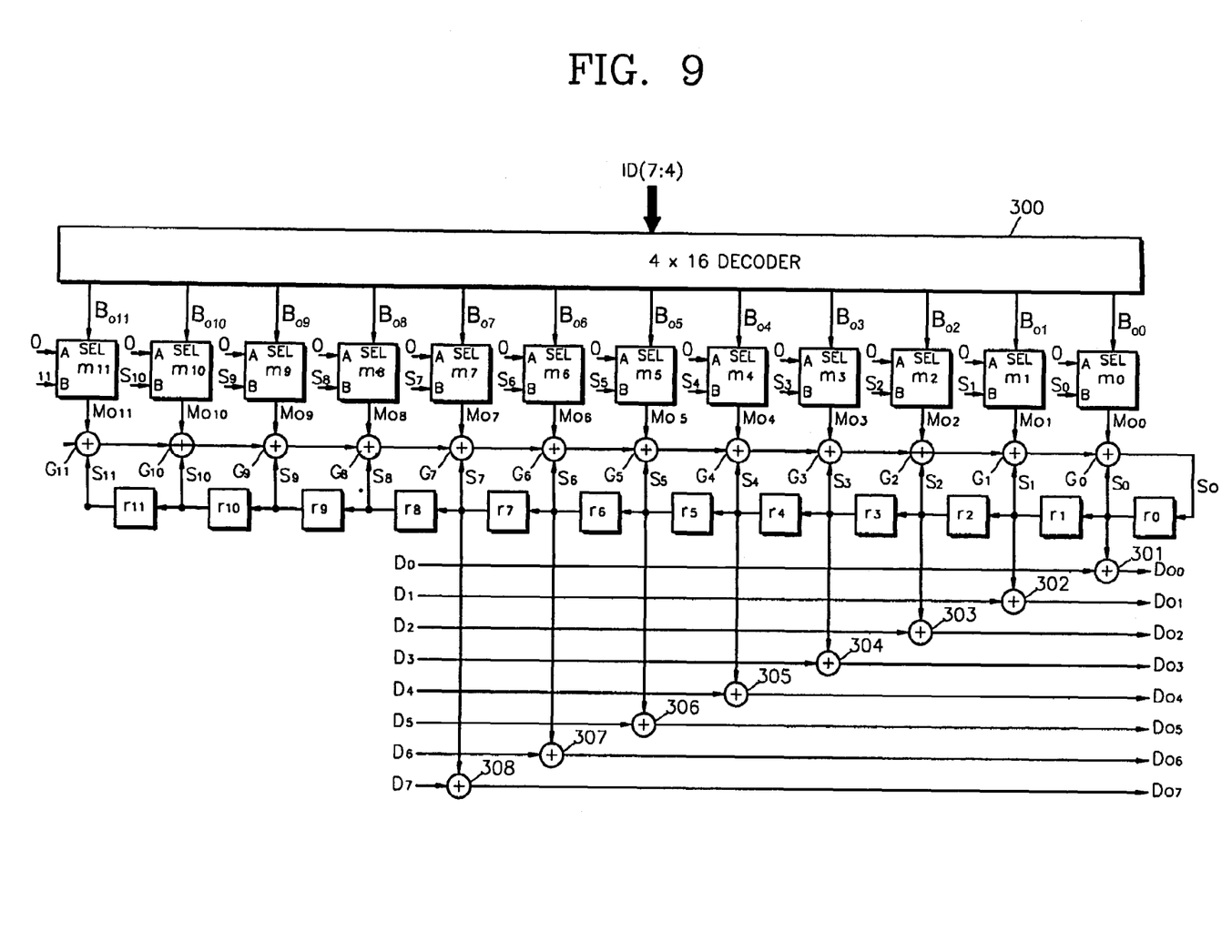
FIG. 9 is a circuit diagram of another embodiment of a scrambler for a high density disc system according to the present invention.

The third structure of a scrambler according to the present invention is shown in FIG. 9. While the structure of the scramblers in FIG. 4 and FIG. 6 have registers $r_0$ through $r_{15}$ for generating random data having a 64 K cycle and perform scrambling with changing initial values in each sector, the scrambler in FIG. 9 has 16 kinds of decoding values, each for generating random data having a 4 K cycle, and changes the effective structure of a random data generator according to the upper 4 bits (ID(7:4)) of the last byte in a 4-byte identification code (ID) which is allocated to each sector.

The scrambler of FIG. 9 has a random data generator having a 4×16 decoder 300, 12 multiplexors $m_0$ through $m_{11}$, 12 XOR gates $G_0$ through $G_{11}$, and 12 registers $r_0$ through $r_{11}$, and the scrambler further has XOR gates 301 through 308 for outputting the result $D_{01}$ through $D_{07}$ of scrambling by XORing 8-bits of input data $D_0$ through $D_7$ and the outputs of the lower 8 registers $r_0$ through $r_7$, respectively. Here, the 12 multiplexors can be collectively referred to as a selection output circuit, which selectively outputs "0" or the output of each register according to the 12-bit output of the 4×16 decoder 300, and the 12 XOR gates $G_0$ through $G_{11}$ be referred to as a logic circuit, which supplies the 12-bit result of XORing to the least significant register $r_0$.

Figure 10:
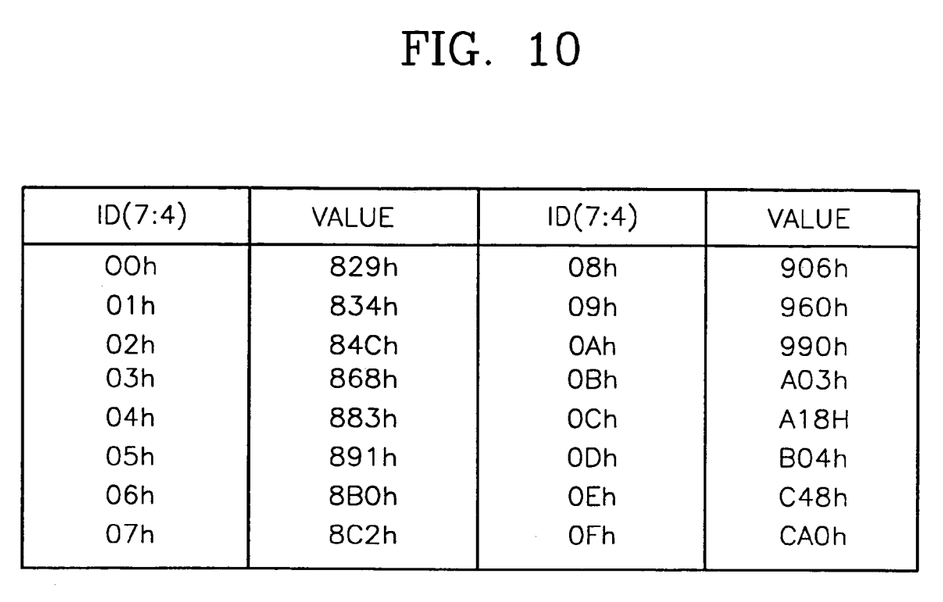
FIG. 10 is a table showing the control values for changing the structure of a scrambler, shown in FIG. 9, in the units of 4K cycle.

When one of the control values (829h, 834h, 84Ch, 868h, 883h, 891h, 8B0h, 8C2h, 906h, 960h, 990h, A03h, A18h, B04h, C48h, CA0h), as shown in FIG. 10, for controlling changes in the structure of the 16 scrambler configurations (in the scrambler, since the logical existence of each of the multiplexors $M_0$ through $M_{11}$ can be controlled by the bit values $B_0$ through $B_{11}$ input thereinto from the 4×16 decoder 300, although the scrambler maintains the same physical structure, it can be configured in 16 different ways) according to the upper 4 bits (ID(7:4)) of the last 1 byte in a 4-byte identification code allocated to each sector is input every one ECC block, the 4×16 decoder 300 in FIG. 9 supplies a 12-bit output corresponding to the control value, and among the 12-bit output $Bo_0$ through $Bo_{11}$, only those branches which have "1" are effective. The 4×16 decoder can output 16 kinds of decoding values according to its 4-bit inputs. Here, the initial values of registers $r_0$ through $r_{11}$ are set in units of one ECC block, and, for example, the initial values are set to "001h".

The multiplexors $m_0$ through $m_{11}$ receive the 12 output bits $B_{o0}$ through $B_{o11}$ as a selection signal, and when values of the outputs $B_{o0}$ through $B_{o11}$ of the 4×16 decoder 300 are "1", corresponding multiplexors $m_0$ through $m_{11}$ supply "0", which is input to the first input end (A), to one end of corresponding XOR gates of $G_0$ through $G_{11}$, as an output signal $Mo_0$ through $Mo_{11}$. Corresponding XOR gates of $G_0$ through $G_{11}$ output values of $S_0$ through $S_{11}$ of each corresponding register $r_0$ through $r_{11}$, which are input to the other end of each XOR gate $G_0$ through $G_{15}$, without change, and the accumulated output value of XOR gate $G_0$ is fed back and input to the least significant register $r_0$.

In addition, when values of the outputs $B_{o0}$ through $B_{o11}$ of the 4×16 decoder 300 are "0", corresponding multiplexors of $m_0$ through $m_{11}$ supply the outputs $S_0$ through $S_{11}$ of each corresponding register $r_0$ through $r_{11}$, which is input to the second input end of the second input end (B), as its own output signal $Mo_0$ through $Mo_{11}$. Then, corresponding XOR gates of $G_0$ through $G_{11}$ XOR $S_0$ through $S_{11}$, which are the output of each multiplexor $m_0$ through $m_{11}$, and $S_0$ through $S_{11}$, which are the output of the corresponding registers $r_0$ through $r_{11}$. At this time, since the output of the corresponding XOR gates $G_0$ through $G_{11}$ finally become "0", no feedback value is input to the least significant register $r_0$.

By doing so, 4K of random data from each register $r_0$ through $r_{11}$ are generated in units of a sector, and the result $D_{01}$ through $D_{07}$ of scrambling by XORing 1 byte of input data $D_0$ through $D_7$ and each output of the lower 8 registers $r_0$ through $r_7$ in XOR gates 301 through 308 is provided.

Thus, the structure of a scrambler can be changed depending on the capacity of the innermost circumference track, the capacity of the outermost circumference track, the size of a sector and the size of an ECC block. That is, a system using an HD-DVD, in which the sector size is 2 KB and the ECC block size is 32 sectors, can use the scrambler which is used in a general DVD system, without change. Meanwhile, a system using an HD-DVD, in which the sector size is 4 KB and the ECC block size is 16 sectors, can use one of the three types below.

o) scrambled data is output when a random generator performs an 8-bit shift: FIG. 4 (FIG. 6)+FIG. 5;

Ii) scrambled data is output when a random data generator performs a 1-bit shift: FIG. 4 (FIG. 6)+FIG. 8; or Iii) a random data generator whose structure can be changed according to the decoding values: FIG. 9+FIG. 10.

In the meantime, the conditions for the random data generation cycle of a random data generator used in a scrambler for an optical disc system will now be explained.

When it is assumed that a first data frame (Data Frame 1) is a sector, a second data frame (Data Frame 2) is an ECC block, the scrambled data amount in the first data frame is b, the scrambled data amount in the second data frame is B, the scrambled data amount in the innermost circumference track is A, and the scrambled data amount of two tracks in the outermost circumference is C, the following condition 1, condition 2, and condition 3 must be met, and the random data generation cycle of the random data generator in a scrambler of an optical system must be equal to or greater than b×C/B. The same values from the random data generator or the same decoding values can be used while the random data generator does not exceed α×/B.

Data Frame 2=n×Data Frame 1, n is an integer.    Condition 1)

$|A/B|=\alpha, |A/B|$ represents the integer part of $A/B$.    Condition 2)

$|C/B|=\beta, |C/B|$ represents the integer part of $C/B$.

EXAMPLE 1) A GENERAL DVD

When Data Frame 1=2K (b), Date Frame 2+32K (B), and the scrambled data amount of two tracks in the outermost circumference=284K (C), a random data generator.

EXAMPLE 2) THE FIRST CASE OF AN HD-DVD HAVING A LINE DENSITY IN A TANGENTIAL DIRECTION APPROXIMATELY TWICE AS HIGH AS THAT OF A DVD

When Data Frame 1=4K (b), Data Frame 2=64K (B), and the scrambled data amount of two tracks in the outermost circumference=568K (C), a random data generation cycle must be equal to or greater than 35.5 K (=4K×568/64K). Since α=int|120K/64K|=1, it is possible to use an initial value or a decoding value while the random data generation cycle does not exceed 64K.

EXAMPLE 3) THE SECOND CASE OF AN HD-DVD HAVING A LINE DENSITY IN A TANGENTIAL DIRECTION APPROXIMATELY TWICE AS HIGH AS THAT OF A DVD

When Data Frame 1=8K (b), Data Frame 2=64K (B), and the scrambled data amount of two tracks in the outermost circumference=568K (C), a random data generation cycle must be equal to or greater than 71 K (=8K×568/64K). Since α=int 120K/64K|=1, it is possible to use an initial value or a decoding value while the random data generation cycle does not exceed 128K.

EXAMPLE 4) THE THIRD CASE OF AN HD-DVD HAVING A LINE DENSITY IN A TANGENTIAL DIRECTION APPROXIMATELY TWICE AS HIGH AS THAT OF A DVD

When Data Frame 1=2K (b), Data Frame 2=64K (B), and the scrambled data amount of two tracks in the outermost circumference=568K (C), a random data generation cycle must be equal to or greater than 17.75K (=4K×568/64K), and the scrambler of a general DVD system can be used. Since α=int 120K/64K|=1, it is possible to use an initial value or a decoding value while the random data generation cycle does not exceed 6432K.

The present invention can be used in equipment using data scrambling, and particularly, can be efficiently used in a high density disc system.

The scrambling method of the scrambler according to the present invention is advantageous in generating a stable servo signal and suppressing the DC component in modulation in high density optical recording/reproducing apparatuses. In addition, since the scrambler can generate random data having a long cycle of equal to or greater than 64 K, it can be applied to an HD-DVD system.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A data scrambler for a high density optical recording and/or reproducing apparatus using an optical disc, the data scrambler comprising:
    a random data generator which generates random data having a random data generation cycle based on a result obtained by multiplying at least a size of a first data frame by a result obtained by dividing a data amount of two tracks in an outermost circumference of the optical disc by a size of a second data frame, wherein the random data generator comprises:
    serially arranged registers, which shift-store n bits and generate the random data, and use a total of n values as initial values, including a first initial value and register values, which are supplied in each 4K times left-shifting of the first initial value,
    a first serial logic circuit having a plurality of logic gates, which exclusive-ORs outputs of a first group of the registers which correspond to a number of effective branches with a predetermined branch value, and feedbacks the random data to a least significant register,
    wherein the data scrambler further comprises a second logic circuit which scrambles outputs of a second group of registers and input data and outputs scrambled data in units of bytes to the recording and/or reproducing apparatus.

2. The data scrambler of claim 1, wherein the size of the first data frame is one sector, and the size of the second data frame is one error correction block.

3. The data scrambler of claim 1, wherein the random data generation cycle is at least as great as the result obtained by multiplying at least the size of the first data frame by the result obtained by dividing the data amount of the two tracks in the outermost circumference of the optical disc by the size of the second data frame.

4. The data scrambler of claim 1, wherein the random data generator further comprises:
    first register values, which are output after shifting the first initial value 7 times, a second initial value immediately after a capacity required for return of the first initial value and the first register values, and
    second register values which are output after shifting the second initial value 7 times.

5. The data scrambler of claim 4, wherein the random data generation cycle is 216 (=64 K) when n is 16.

6. The data scrambler of claim 4, wherein the number of effective branches is at least 4, and the effective branch value is any one of 8016h, 801 Ch, 8029h, 80D0h, 810Ah, 810Ch, 8112h, 8142h, 8148h, 8150h, 8214h, 8241h, 8244h, 8248h, 8260h, 8320h, 8406h, 8430h, 8540h, 8580h, 8610h, 8805h, 8821h, 8841h, 8842h, 8920h, 8940h, 8A04h, 9028h, 9082h, 9120h, 9420h, 9840h, 9C00h, A084h, A101h, A108h, A140h, A440h, A801h, A840h, B010h, B400h, C009h, C00Ah, C042h, C108h, C120h, C208h, C801h, CA00h, and D008h.

7. The scrambler of claim 4, wherein the effective branch value is "B400h" and the initial values include the first initial value as 0001 h, the first register values as (0002h, 0004h, 0008h, 0010h, 0020h, 0040h, 0080h), which are obtained by left-shifting 0001 h 7 times, the second initial value as 7E80h, a result of the registers after 32K, which is the capacity required for the return of the first initial and the first register values (B400h, 0002h, 0004h, 0008h, 0010h, 0020h, 0040h, 0080h), and the second register values as (FF01 h, FE02h, FC04h, F808h, F011h, E023h, C046h), which are obtained by left-shifting the second initial value 7E80h 7 times.

8. The data scrambler of claim 1, wherein the random data generation cycle is 216 (=64 K) when n is 16.

9. The data scrambler of claim 1, wherein the number of effective branches is at least 4, and the effective branch value is any one of 8016h, 801 Ch, 8029h, 80D0h, 810Ah, 810Ch, 8112h, 8142h, 8148h, 8150h, 8214h, 8241h, 8244h, 8248h, 8260h, 8320h, 8406h, 8430h, 8540h, 8580h, 8610h, 8805h, 8821h, 8841h, 8842h, 8920h, 8940h, 8A04h, 9028h, 9082h, 9120h, 9420h, 9840h, 9C00h, A084h, A101 h, A108h, A140h, A440h, A801h, A840h, B010h, B400h, C009h, C00Ah, C042h, C108h, C120h, C208h, C801h, CA00h, and D008h.

10. The data scrambler of claim 1, wherein the value of the effective branch is "B400h" and the initial values include the first initial value as 0001 h and the register values as (3DADh, D4E7h, FDCAh, EBCCh, 292Eh, 50F0h, BFCAh, 7F80h, D36Eh, BB39h, 5DFFh, A809h, 6647h, 8044h, 0304h), which are obtained after every 4096 times left-shifting of the first initial value 0001 h.

11. The data scrambler of claim 1, wherein the random data generator changes the effective branch value in units of a first cycle and generates a second cycle of the random data according to a control value.

12. The data scrambler of claim 11, wherein the first cycle corresponds to an error correction block and the second cycle corresponds to a sector.

13. The data scrambler of claim 11, wherein the second cycle is 4 K, and the control value is one of 829h, 834h, 84Ch, 868h, 883h, 891 h, 8B0h, 8C2h, 906h, 960h, 990h, A03h, A18h, B04h, C48h, and CA0h in units of an error correction block.

14. The data scrambler of claim 12, wherein the random data generator comprises:
    a decoder which supplies 12 output bits, which correspond to 16 kinds of control values, in units of an error correction block;

registers, arranged serially, which shifting-store 12 bits and generate random data in units of a sector;

a selection output circuit which receives the 12 output bits supplied from the decoder, as a selection signal, supplies a predetermined value for each bit of an effective branch among the 12 output bits from the decoder, and otherwise supplies corresponding outputs of the registers, to generate 12 outputs; and a first logic circuit which exclusive-ORs the 12 output bit of the selection output circuit and the 12 output bits of the registers and then, feeds back a result of the exclusive-ORing only for each bit of the effective branch among the 12 output bits from the decoder, wherein the data scrambler further comprises a second logic circuit which scrambles outputs of a predetermined number of least significant ones of the registers and input data in units of a byte.

15. The data scrambler of claim 14, wherein initial values of the register are newly set in each error correction block.

16. The data scrambler of claim 1, wherein:
the amount of scrambled data in the first data frame is 4 Kb (Kilobytes) in size;
the amount of scrambled data in the second data frame is 64 Kb in size;
the scrambled data amount of the two tracks in the outermost circumference of the optical disc is less than or equal to 1024 Kb; and
the random data generation cycle is less than or equal to 64 Kb.

17. The data scrambler of claim 1, wherein:
the amount of scrambled data in the first data frame is 8 Kb (Kilobytes) in size;
the amount of scrambled data in the second data frame is 64 Kb in size;
the scrambled data amount of the two tracks in the outermost circumference of the optical disc is less than or equal to 1024 Kb; and
the random data generation cycle is less than or equal to 128 Kb.

18. The data scrambler of claim 1, wherein:
the amount of scrambled data in the first data frame is 2 Kb (Kilobytes) in size;
the amount of scrambled data in the second data frame is approximately 64 Kb in size; and
the scrambled data amount of the two tracks in the outermost circumference of the optical disc is less than or equal to 1024 Kb; and
the random data generation cycle is less than or equal to 32 Kb.

19. The data scrambler of claim 1, wherein the random data generation cycle is at least 64 Kb (Kilobytes).

20. The data scrambler of claim 4, wherein:
the size of the first data frame is a sector and the size of the second data frame is an error correction block; and
the initial values are determined by an upper 4 bits of a last byte in a 4-byte identification code which is allocated in each of a plurality of the first data frames.

21. The data scrambler of claim 1, wherein:
the size of the first data frame is a sector and the size of the second data frame is an error correction block; and
the initial values are determined by an upper 4 bits of a last byte in a 4-byte identification code which is allocated in each of a plurality of the first data frames.

22. The data scrambler of claim 14, wherein:
the size of the first data frame is a sector and the size of the second data frame is an error correction block; and
the initial values are determined by an upper 4 bits of a last byte in a 4-byte identification code which is allocated in each of a plurality of the first data frames.

23. The data scrambler of claim 1, wherein the random data generator further comprises:
a decoder to selectively output n bits as valid and invalid bits in response to input m bits;
n registers arranged in serial, which shift and store the n bits, to generate shifted n bits as the random data;
a selection circuit which selects a predetermined value or the shifted n bits for ones of the shifted n bits, to generate a selection signal; and
logic gates arranged in serial, which perform XOR operations on the ones of the shifted n bits, the ones of the shifted n bits, and an output of an adjacent more significant one of the logic circuits, wherein the output of the logic gate associated with a least significant of the ones of the shifted n bits is fed back to a least significant one of the registers.

24. The data scrambler of claim 23, further comprising:
a scrambling circuit which performs XOR operations on a plurality of least significant ones of the shifted n bits and corresponding input data bits after the n registers 8-bit left shift the n bits.

25. The data scrambler of claim 23, further comprising:
a scrambling circuit which performs XOR operations on a plurality of least significant ones of the shifted n bits and corresponding input data bits after each one-bit left shift of the n-registers.

26. The data scrambler of claim 23, further comprising:
a scrambling circuit which performs XOR operations on a plurality of least significant ones of the shifted n bits and corresponding input data bits after the n registers 4k left shift the n bits.

27. A data scrambler for a high density optical recording and/or reproducing apparatus using an optical disc, comprising:
a random data generator including serially arranged registers, which shift-store n bits and generate the random data, and use a total of n values as initial values, including a first initial value and register values,
a first serial logic circuit having a plurality of logic gates, which exclusive-ORs outputs of a first group of the registers and feedbacks the random data to a least significant register, and
a second logic circuit which scrambles outputs of a second group of registers and input data and outputs scrambled data in units of bytes to the recording and/or reproducing apparatus,
wherein the random data generator generates the random data having a random data generation cycle based on a result obtained by multiplying at least a size of a first data frame by a result obtained by dividing a data amount of two tracks in an outermost circumference of the optical disc by a size of a second data frame.

28. The data scrambler of claim 27, wherein the optical disc has error correction blocks each error correction block comprising sectors, wherein:
the random data generator adjusts the random data generation cycle of the random data based upon the size of each sector and a size of each error correction block.

29. A data scrambler for a high density optical recording and/or reproducing apparatus using an optical disc having error correction blocks, each error correction block comprising sectors, the data scrambler comprising:
a random data generator which generates random data having a random data generation cycle based on a result obtained by multiplying at least a size of a first data frame by a result obtained by dividing a data amount of two tracks in an outermost circumference of the optical disc by a size of a second data frame; and a scrambling circuit which scrambles the generated random data and outputs scrambled data in units of bytes.

* * * * *

UNITED STATES PATENT AND TRADEMARK OFFICE
CERTIFICATE OF CORRECTION

PATENT NO. : 7,277,545 B1 Page 1 of 1
APPLICATION NO. : 09/620462
DATED : October 2, 2007
INVENTOR(S) : Jae-seong Shim It is certified that error appears in the above-identified patent and that said Letters Patent is hereby corrected as shown below:

Column 10, line 62, change "claim 12" to --claim 11--.

Signed and Sealed this

Eleventh Day of December, 2007

JON W. DUDAS
*Director of the United States Patent and Trademark Office*